United States Patent [19]
Nyhart

[11] Patent Number: 5,363,426
[45] Date of Patent: Nov. 8, 1994

[54] EXTENDED RANGE PAGING FOR A RADIO FREQUENCY COMMUNICATION SYSTEM

[75] Inventor: Scott O. Nyhart, Algonquin, Ill.

[73] Assignee: Motorola, Inc., Schaumburg, Ill.

[21] Appl. No.: 227,490

[22] Filed: Apr. 14, 1994

Related U.S. Application Data

[63] Continuation of Ser. No. 909,274, Jul. 6, 1992, abandoned.

[51] Int. Cl.[5] .................... H04M 11/00; H04Q 7/00
[52] U.S. Cl. ...................................... 379/57; 379/58; 379/60; 379/61; 455/33.1; 455/34.2
[58] Field of Search .................. 370/58.1; 379/56, 57, 379/58, 59, 60, 61, 63; 455/33.1, 34.2, 56.1

[56] References Cited

U.S. PATENT DOCUMENTS

| | | | |
|---|---|---|---|
| 3,663,762 | 5/1972 | Joel, Jr. | 379/60 |
| 4,415,770 | 11/1983 | Kai et al. | 179/2 EB |
| 4,613,990 | 9/1986 | Halpern | 455/33.1 |
| 4,661,972 | 4/1987 | Kai | 379/57 |
| 4,829,554 | 5/1989 | Barnes et al. | 379/58 |
| 4,947,420 | 8/1990 | Stahl et al. | 379/57 |
| 5,032,835 | 7/1991 | DeLuca | 340/825.44 |
| 5,090,951 | 2/1992 | Muppidi et al. | 379/61 |
| 5,128,928 | 7/1992 | Wilder et al. | 370/58.1 |
| 5,151,930 | 9/1992 | Hagi | 379/57 |
| 5,153,903 | 10/1992 | Eastmond et al. | 379/57 |
| 5,203,013 | 4/1993 | Breeder et al. | 455/34.2 |
| 5,212,725 | 5/1993 | Yamamoto et al. | 379/58 |
| 5,239,572 | 8/1993 | Saegusa et al. | 379/61 |
| 5,255,308 | 10/1993 | Hashimoto et al. | 379/61 |

FOREIGN PATENT DOCUMENTS

| | | |
|---|---|---|
| 0212761 | 3/1987 | United Kingdom . |
| 2253972 | 9/1992 | United Kingdom ................... 379/57 |

Primary Examiner—Curtis Kuntz
Assistant Examiner—William Cumming
Attorney, Agent, or Firm—Andrew S. Fuller

[57] ABSTRACT

A method of determining when a communication device (11) is out-of-range of an incoming call from a central station (25), disallows communication between them for the out-of-range condition. In the central station (25), a page signal is transmitted (20) representing a call to the communication device (11). The central station (25) is capable of receiving (12) signals transmitted by the communication device (11). Recognizing (40) a lack of response by the communication device to the page signal from the central station, the central station withholds the transmission of a call set-up grant signal. Meanwhile, in the communication device, signals transmitted by the central station are received (50). The communication device transmits a page-response signal (555) representing the reception of the page signal. Recognizing an absence of a call set-up grant signal (562), the communication device indicates (563) to the subscriber that the communication device is out-of-range of the coverage area of the central station for the call.

7 Claims, 5 Drawing Sheets

EXTENDED RANGE PAGING FOR A RADIO FREQUENCY COMMUNICATION SYSTEM

This is a continuation of application Ser. No. 07/909,274, filed Jul. 6, 1992, and now abandoned.

BACKGROUND OF THE INVENTION

This invention relates generally to radio communication systems, and more particularly to a system for detecting when a communication device, such as a cordless telephone, is not capable of communication with a central station.

Examples of various radio frequency (RF), portable, or cordless communication systems include cellular telephones, trunking radios, and the next generation of cordless telephones (called CT-2, for cordless telephones, second generation). A cordless, or portable telephone is typically understood to be a transceiving device designed to travel with the user.

In these systems, to establish communication between the communication devices, such as cordless telephones, a requesting cordless telephone transmits a call request to a central or base station. Upon receipt of the request, the central station returns a grant code.

Generally, a communication channel comprises a pair of frequencies for duplex operation or a single frequency for simplex operations. An inbound frequency (on the simplex or duplex channel) carries information from the cordless telephones to the central station, while the outbound frequency (on the other frequency of the duplex channel or the same frequency on the simplex channel) carries information from the central station to the cordless telephones.

When a cordless telephone is operating at such a distance (or range) from the central station that the cordless telephone has insufficient power to transmit to the central station or the base, even though the more powerful central station's transmission can reach the cordless telephone, the cordless telephone, or handset, is not in communication with a central station. In this area of weak signal strength, the cordless telephone is out-of-range.

The out-of-range condition could also be caused by channel losses, such as those due to fading or other environmental conditions surrounding the handset. One major cause of additional channel loss is the collapsed state of the handset itself. When not in use, and as an aid to traveling, the handset will probably be carried in a collapsed or closed state, with its antenna retracted. For portability, the collapsed handset will most likely be carried in a briefcase, belt holster, or pocket. Depending on the material (i.e., metal) of the carrying receptacle, its location, and the handset's retracted antenna, may all result in additional losses on the channel.

Fortunately, these additional channel losses are not seen in normal operation of the handset, with the antenna extended. However, when the base detects an inbound call from a subscriber on a land-line telephone or a cordless telephone, for another subscriber, the base must signal the other subscriber's handset, while the handset is still in a collapsed state. If the base does not overcome the worsened channel condition, a reduced range for the handset would occur.

Adding a more robust type of signaling (having more probability of signal detection) or increasing the transmitted power during initial signaling can overcome the reduced sensitivity of the collapsed handset. However, both methods create another problem, if the handset is still out-of-range. Extra base transmission range will be gained, but the handset would ring, to announce an incoming call, without being in a location to establish a reliable communication contact. Thus, the handset could ring, but the data and/or voice communication link would not be present, until the user traveled back into range, to allow the handset's transmission to be received. This annoyance would also give the user a poor system operation perception. If the phone rings, the user should be able to answer it, and have its answer received. Therefore, there is a need to indicate an out-of-range condition, without increasing the perception of a poor system operation.

SUMMARY OF THE INVENTION

Basically, a method of determining when a communication device is out-of-range of an incoming call from a central station, disallows communication between them for the out-of-range condition. In the central station, a page signal is transmitted representing a call to the communication device. The central station is capable of receiving signals transmitted by the communication device. Recognizing a lack of response by the communication device to the page signal from the central station, the central station withholds the transmission of a call set-up grant signal. Meanwhile, in the communication device, signals transmitted by the central station are received. The communication device transmits a page-response signal representing the reception of the page signal. Recognizing an absence of a call set-up grant signal, the communication device indicates to the subscriber that the communication device is out-of-range of the coverage area of the central station for the call.

DESCRIPTION OF THE PREFERRED EMBODIMENT

Figure 1:
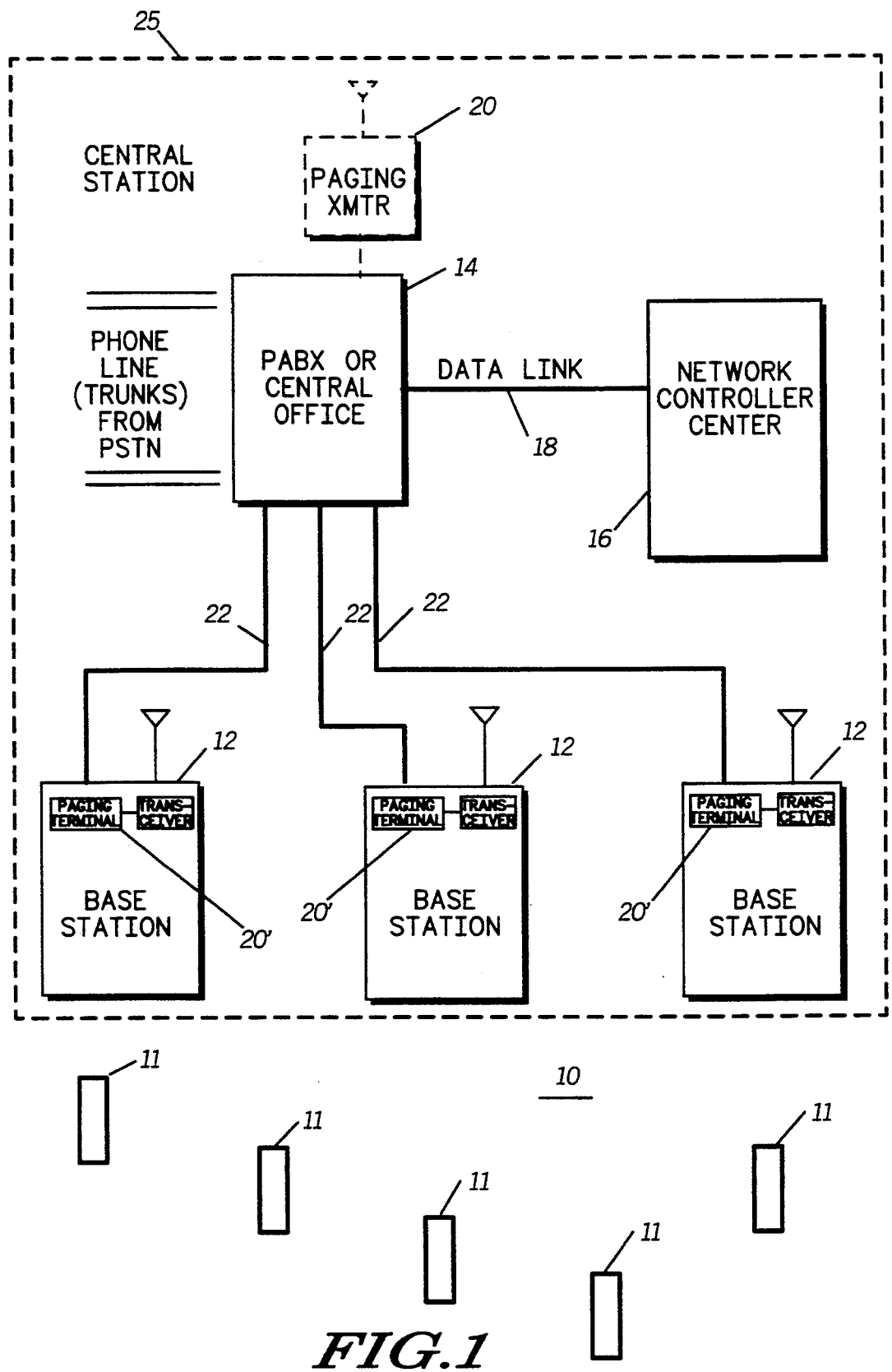
FIG. 1 is a block diagram of a radio communication system in accordance to the present invention.

Referring to FIG. 1, the radio communication system 10 is designed to interface communication devices, such as cordless or wireless telephones to a fixed end, such as the Public Switched Telephone Network (PSTN). While the preferred embodiment is illustrated in the context of a simple RF telephone system, having a single duplex channel, which has no hand-off capabilities, other suitable systems could be utilized. Examples of various other RF, portable, or cordless telephone or communication systems include cellular telephones, trunking radios, and CT-2 cordless telephones.

In this system 10, a plurality of portable radio telephone devices, such as handsets 11, can interface with the PSTN via any one of a plurality of base stations 12. The handsets 11 comprise selective call portable transceivers with dial interconnect capability, each having a unique signaling address. In other words, each handset 11 is designed as a transceiver which is designed for receiving and originating telephone calls. When traveling, the handset 11 can originate calls if it is within range of a base station 12.

The present invention can work with any type of telephone system or network such as the public switched telephone system (PSTN) or a pdvate system. Private systems include a key system, a private branch exchange (PBX), or a private automated branch exchange (PABX). When a telephone user desires to contact a handset user who is traveling, a telephone number corresponding to the handset's ID would be dialed to connect the phone user to a wired or wireless PABX 14, which can be a switching station or a central telephone office. Such a PABX can be coupled to a network controller center 16 via a data link 18 for purposes of identifying handset IDs, and the like. When a call is received at the PABX 14 for a particular handset 11, the PABX would originate a paging message, which would include an ID for the called handset.

A paging terminal 20', included within one or all of the base stations 12, or alternately, within the PABX 14, formats a paging call signal with a signaling address corresponding to the corresponding handset 11. This information would be transmitted, preferably by the base station 12, or optionally, by an external wide area paging transmitter 20 to the handsets 11. The pages would be transmitted repetitively by the base station 12, until the caller hangs up or until a communication link has been established. Alternatively, the base station, without the paging terminal 20', would have to indicate to the external paging transmitter 20, via the central office 14 and the network control center 16, that the communications handshake has been established between the handset and the base station so that the paging transmitter 20 would cease paging the handset.

Base stations 12 are connected to the PABX by phone lines or trunks 22. Each base station 12 includes at least one transceiver for the connection of a handset to one of the phone lines.

After the page has been sent, the base station 12 would set a timer for a predetermined interval of time to wait for a page-response. After receiving a page-response, the base station 12 would transmit a call set-up to initiate handshake with the handset 11 on a channel.

Each of the handsets 11, if not in use, would have a receive mode in which it would be monitoring the RF channel for pages with its ID. In the event that a page has been made for a handset, which is in range of a base station 12, the page that is made over the channel would be received by the handset. The handset would then automatically acknowledge the page.

The base station, on receipt of the acknowledgment within the allowable time, would respond by dialing the PABX 14 using the communication phone line and would also ring a signal to similarly cause a ring on the handset to alert the user to the incoming phone call.

A central station 25 preferably comprises the fixed equipment or base of the radio frequency communication system and includes at least the base station 12, the paging transmitter 20, and other fixed equipment such as the PABX.

Figure 2:
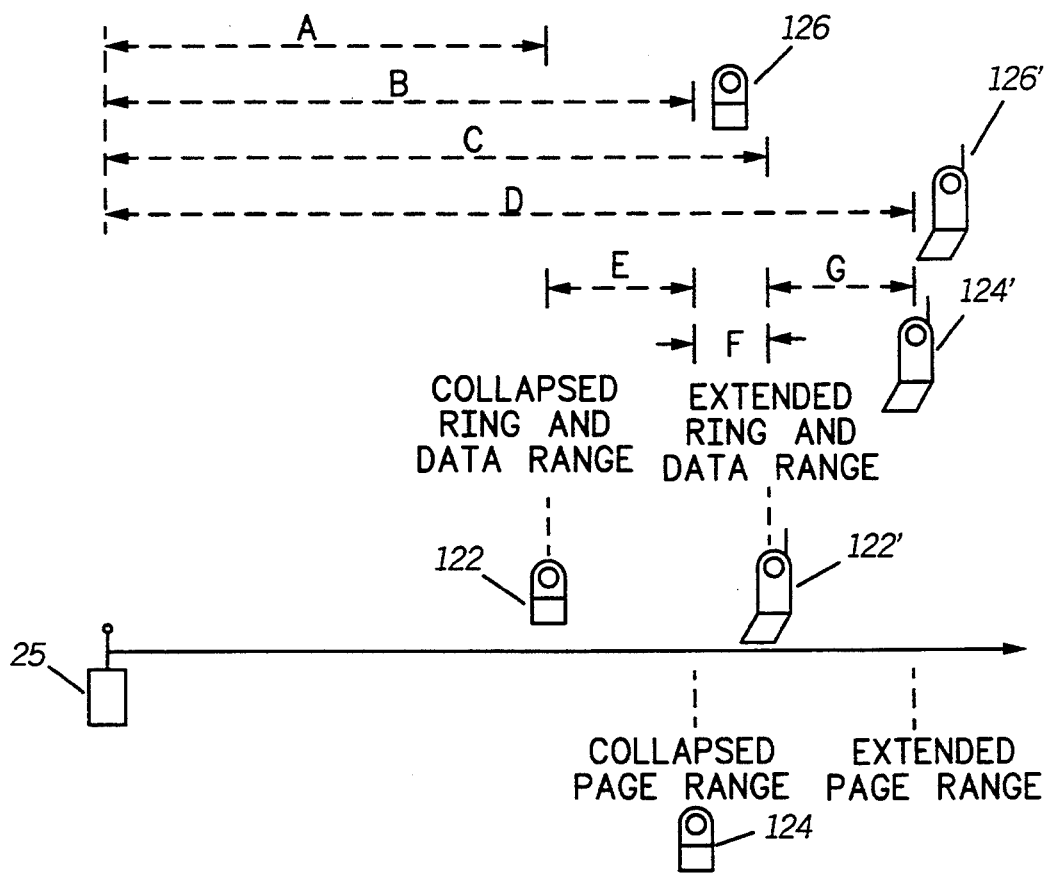
FIG. 2 is an illustration of in and out-of-range representations, in accordance with the present invention.

Referring to FIG. 2, the same handset 11 is shown a plurality of distances away from the central station 25, or from a particular base station 12, and in collapsed states (122, 124, and 126) or in extended states (122', 124', and 126'). Cordless telephone 122 is shown operating at such a distance, within a collapsed ring range A, as to have sufficient power to transmit with the central station 25, even with the antenna retracted in the collapsed state. This means that the handset or cordless telephone 122 will ring to alert its user of an inbound call.

If the same handset has its antenna extended, now designated as 122', it could still ring even when it has been moved to a total distance of E and F, beyond A, to be within an extended ring range C. The total distance of E and F is the extended range provided by the extension of the handset's antenna.

Ordinarily, the central station 25 has enough power to transmit to the cordless telephone 124, but the cordless telephone 124 is shown operating at such a distance, beyond A or C, with its antenna retracted or extended, respectively, or at such a low power that it has insufficient power to transmit back to the central station 25.

To disallow communication between the out-of-range and/or collapsed handset 124, but to announce an incoming call, in accordance with the present invention, the central station 25, having transmit paging capability, transmits a robust signaling only to page the handset 124. By virtue of a paging signal having more redundant signaling features in its protocol or format, the transmitted paging signal will have a higher probability of being detected than a normal signal used in the rest of the two-way signaling protocols of the present invention. In effect, this higher signaling probability level extends the range of when the handset can receive the initial signaling, by a distance of E or G, from the original range of A or C, to a collapsed page range of B or an extended page range D, when the handset's antenna is retracted (124) or extended (124'), respectively.

Within the distance E or G, when the handset's antenna is retracted (124) or extended (124'), the handset 124 or 124', respectively, having receive paging capability, will not ring yet, but beep or otherwise, to alert the user of an incoming inbound call and also indicate in some manner, such as audio, visual, and/or vibrational, that the handset is still out-of-range.

The page signal may, preferably, be a short audible tone which indicates that someone is trying to reach the user, but the user's handset is still out-of-range. If the handset 124 is still collapsed, the tone might alert, or otherwise cause the user to extend the antenna, or the handset may automatically extend the antenna, upon detection of the out-of-range condition. The mere extension of the antenna may be enough to provide the extra sensitivity to the handset 124, even when the handset 124 moves away from the range within distance E to a further distance of F. If not, as when the antenna is already extended in the handset 124', the tone, or a displayed message might prompt the user to return, within the distance G, to the coverage area C, to receive the call. When the user is again in range C, or A, with the antenna extended, or retracted, respectively, a communication link is established and the handset will begin to ring.

Additionally, the cordless telephone is shown, with its antenna retracted (126), at a distance beyond the collapsed page range B, and with its antenna extended (126'), at a distance even beyond the extended page range D. Therefore, central station 25 and cordless telephone 126 are shown mutually not having sufficient power to transmit to each other.

Figure 3:
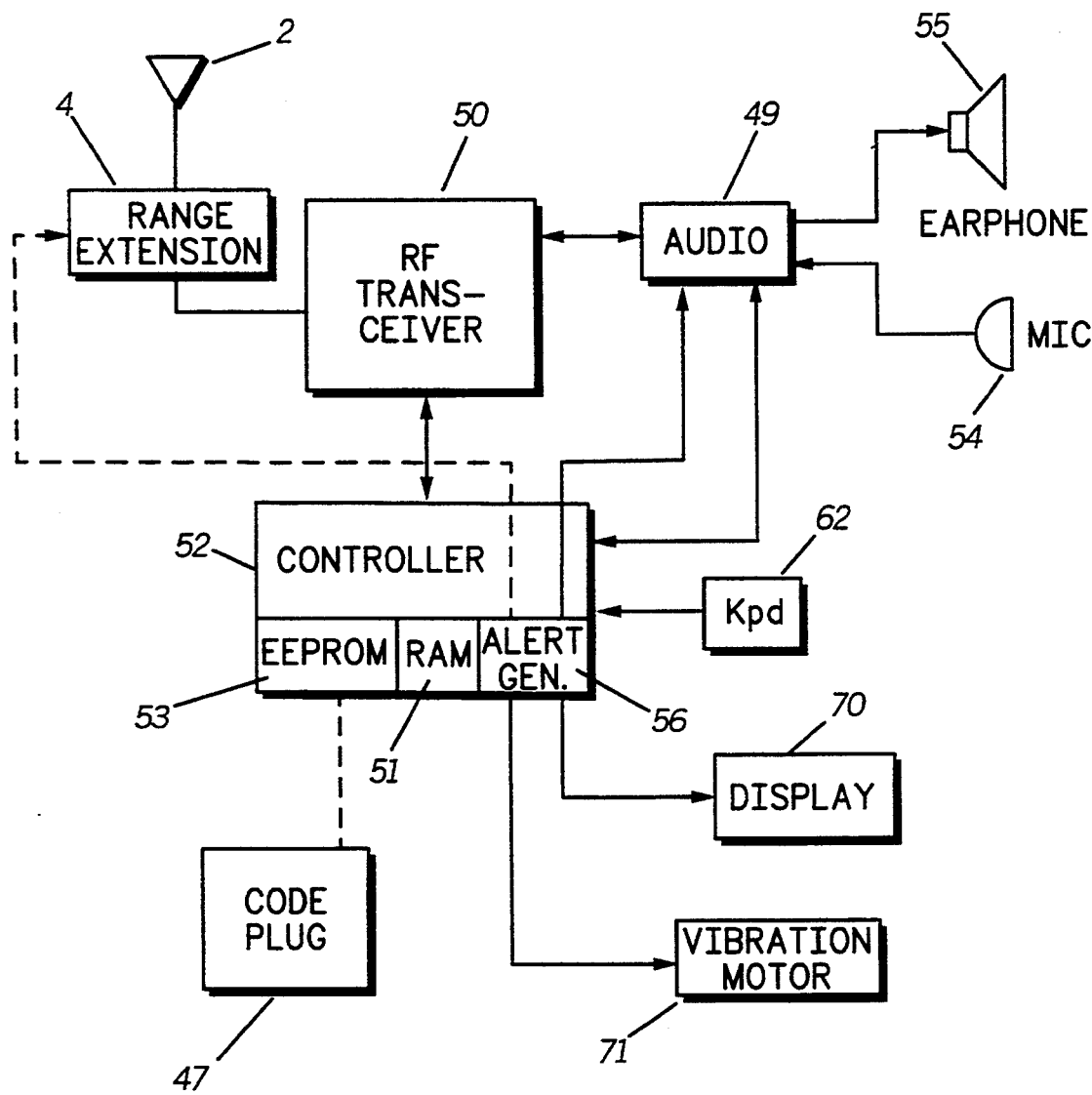
FIG. 3 is a flow chart of the operation of the central station 25 of FIG. 1.

Referring to FIG. 3, a cordless handset 11 in accordance with the invention is shown. The cordless telephone handset 11 comprises a radio transceiver 50 which may receive signals, including pages, and transmit signals, including acknowledgments, in response to the pages. The selective call signals are more likely to be, or better, received by an antenna 2, when extended (4) than retracted.

A controller 52, implemented as a microcomputer, can perform page decoding and timing functions. As the mastermind of the handset 12, the controller 52 includes a non-volatile memory EEPROM (or EAPROM) 53 and a RAM 51. Inside the non-volatile memory EEPROM 53, may be stored the subscriber unit or handset ID number and other system operation parameters. Optionally, a code plug 47 stores the predetermined address information to which the handset 11 will respond.

Figure 6:
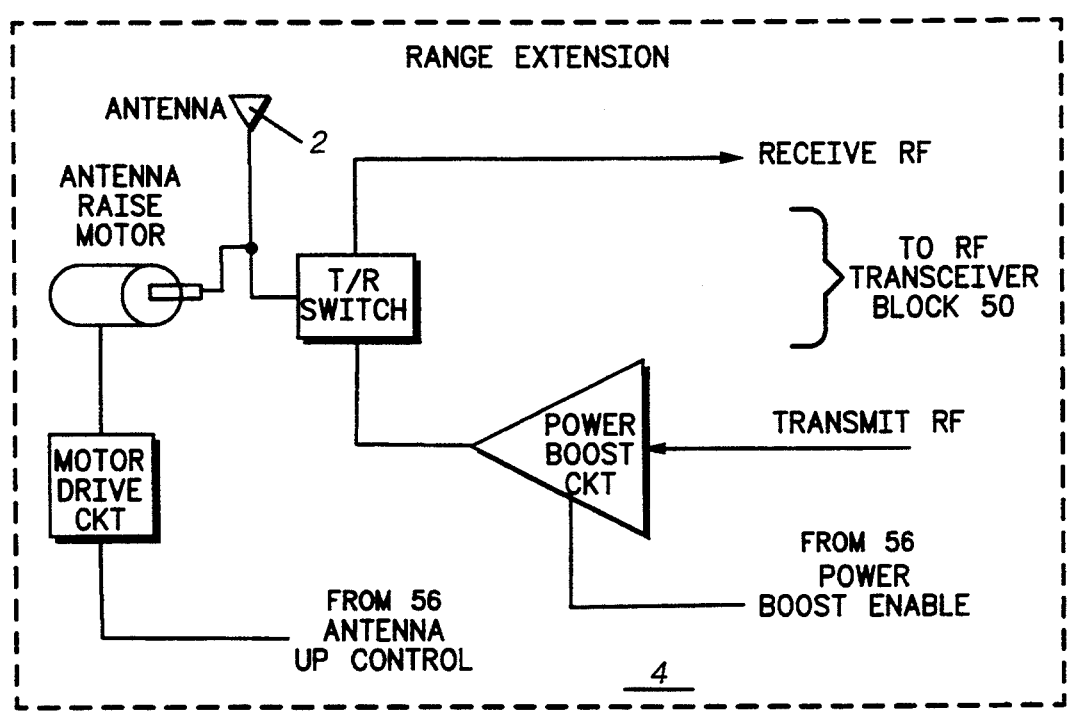
FIG. 6 is a block diagram of possible embodiments of the range extension block 4 of FIG. 3.

The cordless telephone handset 11 further comprises an audio section 49 connected to a speaker or an earphone 55 and a microphone 54. A keypad 62 allows the user to type commands or information to the base station 12, such as dialing a number to make a call request. A display 70, the speaker 55, and/or a vibrational motor 71, may provide the user, or subscriber, with indicating information, representing that the handset is out-of-range, such that a phone line is not connected, to disallow the call. An alert generator 56 provides the indicating information in response to an absence of a received handshake signal, within a predetermined time interval. Optionally, an output of the alert generator 56 could also automatically extend (4) the antenna 2, if it is still retracted or boost the power out of the transmitter, as shown in FIG. 6, to extend the range of the handset.

Figure 4:
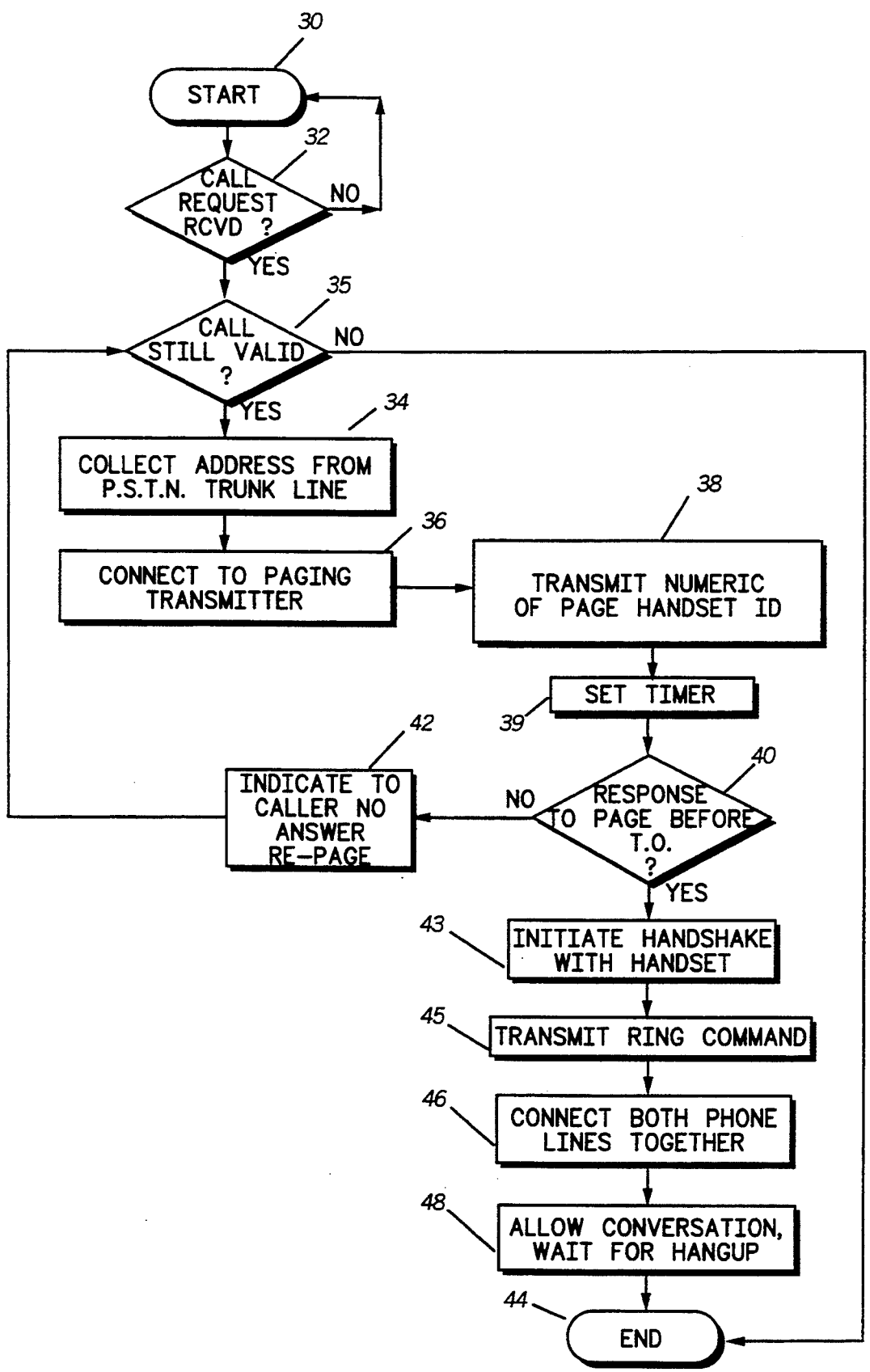
FIG. 4 is a flow chart of the operation of a handset of FIG. 1.

The operation of the central station 25 is illustrated in the flow chart of FIG. 4. It is to be appreciated that functions performed by the PABX could equally be performed by the base station, and vice a versa. Beginning with start block 30, the PABX 14 monitors the incoming phone lines to see if a call request has been received in a decision block 32. If so, the address of the called handset is identified (block 34). If the call request is still valid (caller has not hung-up, etc.), as determined by a decision block 35, the PABX then connects to the base transmitter, in block 36, to transmit a numeric page which would include the handset's ID information (block 38). In block 39, the base station also sets a timer for a predetermined time interval allowable for obtaining a page-response.

Otherwise, if the call request is no longer valid, for example, a predetermined number of page attempts have already been unsuccessful in obtaining acknowledgment responses, the routine ends (44).

After paging, the base station monitors the channel for a response to the page in a decision block 40. If no response is received, within the allotted time, an indication, such as a digitized message that there has been no answer but re-pages will be attempted, would be given to the caller in a block 42. The routine would then return to block 35, after re-paging.

If a response is received, a handshake signal is transmitted to the handset to initiate the call set-up in block 43. A ring command, included in the call set-up information, and following the handshake message, is transmitted for the handset to announce an incoming call in block 45. If the handset "picks-up" to answer the ring, the phone line from the base station 12 and the incoming phone call would then be connected together (block 46) and the PABX would maintain the interconnection for the duration of the conversation, until a "hang-up" is detected in block 44. Similarly, the base station would provide the RF connection between the handset and phone line until the conversation is ended. At that point the routine would end, block 44, and return to start block 30.

Figure 5:
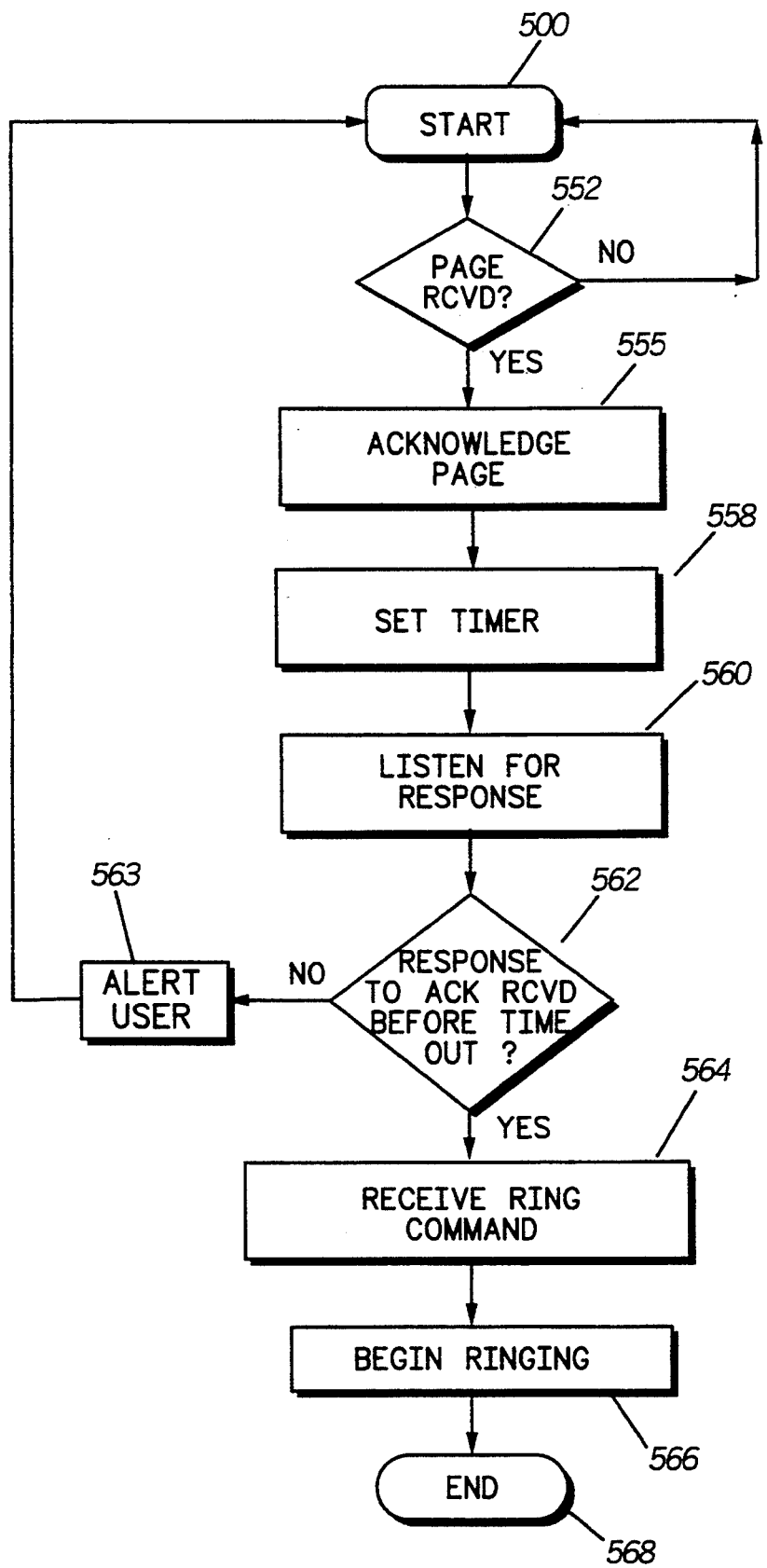
FIG. 5 is a block diagram of the handset of FIG. 1.

The operation of the handset 11 is illustrated in flow chart FIG. 5. The routine starts at block 550 and examines whether a paging signal has been received addressed to itself (decision block 552). If not, the routine continues to monitor the channel for a page. When a page is received with the handset's ID (block 552), the handset transmits an acknowledge signal back to the base station in block 555. The handset sets (558) a timer for a predetermined interval of time allotted to wait for a call set-up from the base station. The channel is monitored, in block 560, for a response from the base station. A decision block 562 then determines if a handshake signal, for a call set-up, was received within the allotted time.

If the handshake is received, the handset begins ringing in block 566, in response to the ring command received (564) from the base station as part of the call set-up information for establishing handshake.

If not, the routine alerts the user in block 563 before returning to start and the call request is not announced by a ring. This situation occurs because, due to channel loss, beit distance or fading, the base station never receives the handset's acknowledge signal. Since the base station never received the acknowledge signal, it never sent the call set-up information, including the handshake. Since the handset did not receive the handshake in a specific time frame, it assumes the acknowledge signal never made it to the base station and subsequently provides indication to the user that a page occurred, signifying an incoming call, but the handset is out-of-range.

The alert generator 56 of FIG. 3 would generate an alert indication to give the user the option of placing the handset within range, by moving back to the coverage area or extending the handset's antenna, for a future page. The alert indication could be visual, using the display 70, audio, using the loudspeaker, earphone 55, vibrational, or using the vibration motor 71.

I claim as my invention:

1. A method of determining when a communication device is within coverage range of a central station for an incoming call, and for disallowing communication between the central station and the communication device the method comprising the steps of: in the central station:

transmitting a page signal representing the incoming call to the communication device, the page signal having a page range extending beyond the coverage range;

for a first predetermined time period to receive a page-response signal transmitted by the communication device to indicate that the communication device is within coverage range;

transmitting a call set-up grant signal over the coverage range when the page-response signal is received from the communication device within the first predetermined time period; and withholding transmission of the call set-up grant signal when no page-response signal is received from the communication device within the first predetermined time period from the communication device; and in the communication device:

receiving the page signal from the central station representing the incoming call to the communication device, the page signal having a page range extending beyond the coverage range;

transmitting the page-response signal representing the reception of the page signal;

waiting for a second predetermined time period to receive the call-setup grant signal from the central station; and indicating to the subscriber that the page signal representing the incoming call has been received and that the communication device is out of the coverage range of the central station for the incoming call when no call-setup grant signal is received from the central station within the second predetermined time period.

2. A cordless telephone comprising:

means for receiving a page signal providing notification that an incoming call is intended for the cordless telephone;

means for transmitting a page-response signal acknowledging the reception of the page signal;

means for detecting a call set-up grant signal responsive to the page-response signal to complete a call set-up;

means for enabling the detecting means for a predetermined signal sampling time during which reception of the call set-up grant signal is expected, in response to the page-response signal transmitted;

means for determining that the cordless telephone is out-of-range when the call set-up grant signal is not detected by the detecting means during the predetermined signal sampling time; and means for indicating to a user that notification of an incoming call was received and that the cordless telephone is out-of-range thereby preventing completion of the call set-up.

3. The cordless telephone of claim 2, wherein the call set-up grant signal comprises a signal to initiate handshake with the cordless telephone.

4. The cordless telephone of claim 2, wherein the page-response signal comprises an acknowledgment signal.

5. The cordless telephone of claim 2, wherein the means for indicating the cordless telephone is out-of-range of the call set-up grant signal further comprising means for automatically extending an antenna of the cordless telephone.

6. The cordless telephone of claim 5, wherein the means for indicating comprises one of:

audio indicating means for audibly alerting to a user;

visual indicating means for visually displaying to the user; and vibrational indicating means for vibrating the user.

7. The cordless telephone of claim 6, wherein the visual indicating means displays a message for the user to return to an in-range area of coverage.

* * * * *